United States Patent [19]
Tessnow et al.

[11] Patent Number: 6,043,614
[45] Date of Patent: Mar. 28, 2000

[54] ALTERNATING CURRENT HID LAMP WITH MAGNETIC DEFLECTION

[75] Inventors: Thomas Tessnow; Robert W. Flanagan, Jr., both of Weare; Donald F. Garrity, Jr., Goffstown, all of N.H.

[73] Assignee: Osram Sylvania Inc., Danvers, Mass.

[21] Appl. No.: 09/099,379

[22] Filed: Jun. 18, 1998

Related U.S. Application Data

[60] Provisional application No. 60/077,090, Mar. 6, 1998.

[51] Int. Cl.[7] ........................................... G05F 1/00
[52] U.S. Cl. .................... 315/291; 315/82; 315/DIG. 5; 315/194; 313/146; 362/508
[58] Field of Search .................... 315/307, 244, 315/308, 309, 291, DIG. 5, 194, 82; 313/146, 152, 153; 362/508

[56] References Cited

U.S. PATENT DOCUMENTS

| | | | |
|---|---|---|---|
| 571,463 | 11/1896 | Thomson . | |
| 2,042,140 | 5/1936 | Bunger | 126/124 |
| 2,612,625 | 9/1952 | Hullegard | 315/338 |
| 3,017,536 | 1/1962 | Irland | 315/83 |
| 3,453,481 | 7/1969 | Schimmelpfennig | 314/20 |
| 3,562,583 | 2/1971 | Zollweg | 315/343 |
| 3,600,091 | 8/1971 | Goleb et al. | 356/85 |
| 3,881,132 | 4/1975 | Miller | 315/344 |
| 3,883,763 | 5/1975 | Kearney | 313/154 |
| 3,988,626 | 10/1976 | Boudouris | 313/113 |
| 4,434,385 | 2/1984 | Makoto | 313/161 |
| 4,720,660 | 1/1988 | Wheelan | 315/344 |
| 4,871,947 | 10/1989 | Miyashita | 315/344 |
| 5,057,747 | 10/1991 | Henderson | 315/158 |
| 5,198,727 | 3/1993 | Allen | 315/291 |
| 5,325,724 | 7/1994 | Kiene et al. | 73/861.16 |
| 5,346,554 | 9/1994 | Suzuki | 118/723 EB |
| 5,436,533 | 7/1995 | Fromm et al. | 315/246 |
| 5,544,532 | 8/1996 | Brown | 73/861.16 |
| 5,589,726 | 12/1996 | Gold | 313/161 |
| 5,773,937 | 6/1998 | Miyazaki et al. | 315/246 |

FOREIGN PATENT DOCUMENTS 917066  1/1963  United Kingdom .

*Primary Examiner*—Don Wong
*Assistant Examiner*—Tuyet T. Vo
*Attorney, Agent, or Firm*—William E. Meyer

[57] ABSTRACT

A magnetic field controller has been developed, which allows magnetic deflection of the arc of an alternating current high intensity discharge (HID) lamp. The controller consists of a driving circuit and an electromagnet. The system delivers a fast switching magnetic field, which can follow the alternating current signal of an alternating current HID ballast. The method minimizes the electromagnet's inductance and uses fast reacting ferromagnetic materials (Ni—Zn ferrite). To achieve the required magnetic field, a current amplifier was developed to pick up the signal from the alternating current ballast and drive the electromagnet with up to two amperes. The alternating magnetically deflected HID lamp system allows the use of magnetic deflection for alternating current HID lamps. A vehicle headlamp system can achieve multiple beam functions (day light running, low beam and high beam) of a headlight system with only one alternating current lamp.

30 Claims, 14 Drawing Sheets

ALTERNATING CURRENT HID LAMP WITH MAGNETIC DEFLECTION

The Applicants hereby claim the benefits of their provisionally filed application, titled "Alternating Current Hid Lamp With Magnetic Deflection" filed Mar. 6, 1998, Ser. No. 60/077,090.

1. Technical Field

The invention relates to electric lamps and particularly to arc discharge electric lamps. More particularly the invention is concerned with magnetic deflection of an alternating current vehicle arc discharge lamp.

2. Background Art

Deflection of an HID arc with a magnet is known. One system for a vehicle used bifurcated electrodes with a magnetic field system to switch the arc between the pairs of electrode tips. Early deflection systems were designed for direct current HID lamps. The direct current magnetic fields were generated by high inductive coils with soft iron cores that required only low coil currents. Subsequent attempts to achieve magnetic deflection with alternating current using the same electromagnets failed. The electromagnets were too slow. It was then believed, that it was not possible to create fast and alternating magnetic fields to follow the signal of the alternating current ballast.

In both, alternating current and direct current HID lamps, the arc is normally curved upward due to internal convection currents. The arc curve can be forced downward by using an external magnetic field. Direct current magnetic deflection uses a magnetic field that is static relative to the arc current. For alternating current, coordinating the magnetic field control with the lamp current is more difficult. Proper deflection of the alternating current arc was believed to require an alternating magnetic field which was fast enough to precede changes in the alternating current signal to the lamp. The problem has been solved by developing an electromagnet that has low inductance, but still delivers the required magnetic field, and a magnet controller, which supplies the necessary current in phase with the ballast signal. In the preferred design, the magnetic field controller picks up the ballast signal before the ignition coil and amplifies it for the electromagnet.

In vehicle headlamp systems, the lamps need to have at least two modes: a low beam mode and a high beam mode. Separate systems may be used, but this approximately doubles the required space, materials and overall cost. It is less expensive to combine the high and low beam lamps if possible. With halogen lamps these modes have been combined by placing two filaments in one lamp capsule. For high intensity discharge (HID) lamps, the arc is not fixed and can be moved by a magnetic field. In an appropriate reflector, the movement of the arc can be shifted between focal regions for the low beam and the high beam. There is then a need for a vehicle system with a single arc lamp providing both high and low beams by magnetic deflection.

DISCLOSURE OF THE INVENTION

A magnetically deflected arc discharge lamp system may be formed from an arc discharge lamp having an arc formed approximately horizontally between two electrodes, a lamp controller receiving power from a power source, and providing alternating lamp current to power the lamp, and providing a power signal indicating the state of the lamp current, an electromagnet positioned adjacent the lamp to affect the position of the arc, and an amplifier circuit receiving power from a power source, and receiving the power signal, and providing alternating current electromagnet power to drive the electromagnet with respect to the alternating lamp current.

BRIEF DESCRIPTION OF THE DRAWINGS

Like reference numbers identify like parts throughout the drawings and specification.

BEST MODE FOR CARRYING OUT THE INVENTION

Figure 1:
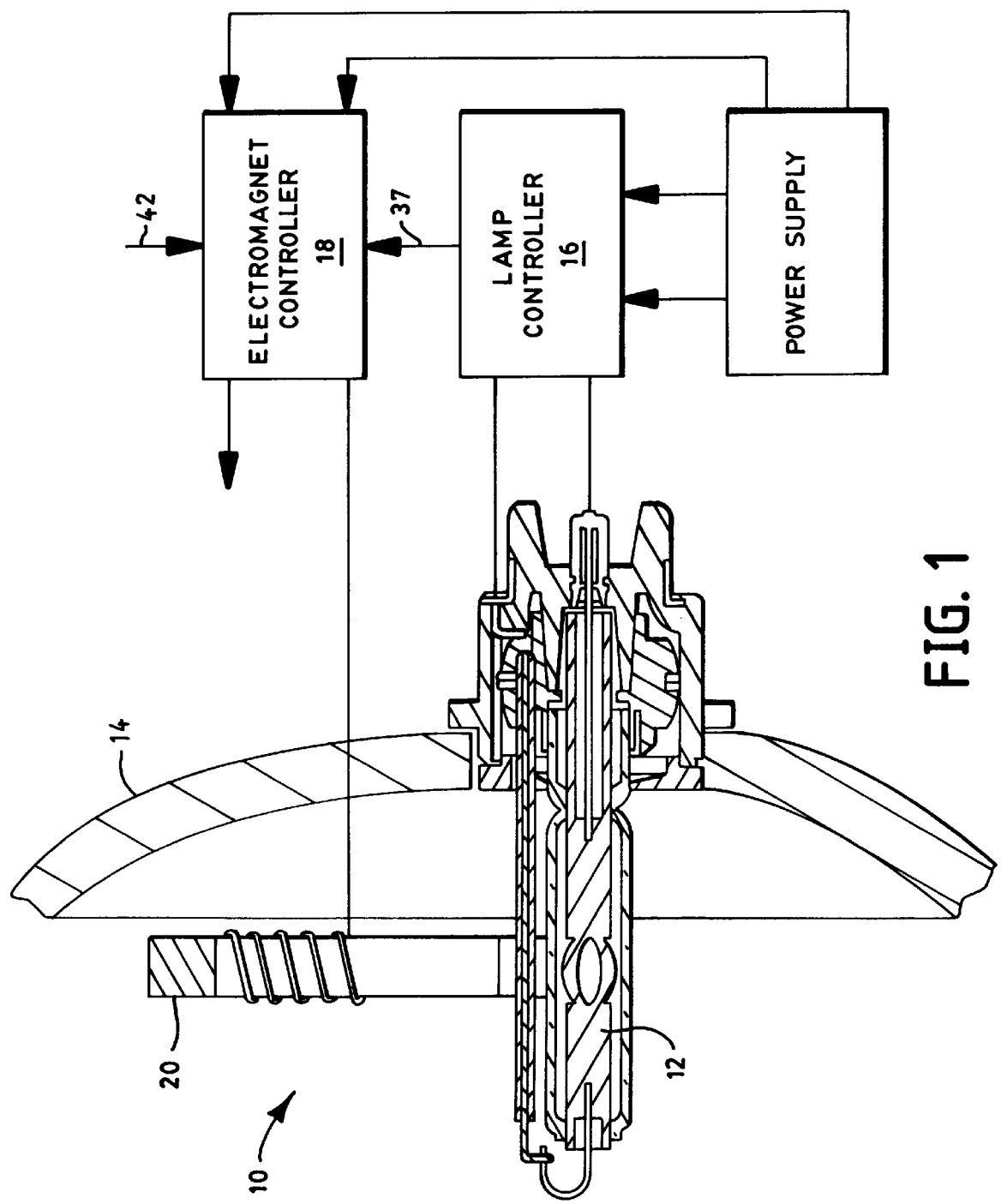
FIG. 1 shows a schematic diagram of a preferred embodiment of an alternating current vehicle HID lamp with magnetic deflection.

FIG. 1 shows a schematic diagram of a preferred embodiment of an alternating current vehicle HID lamp with magnetic deflection. The alternating current HID vehicle lamp with magnetic deflection 10 may be assembled from a miniature high intensity discharge (HID) lamp 12, a vehicle headlamp reflector 14 (partially broken away), an alternating current lamp controller 16, an alternating current electromagnet controller 18, and an electromagnet 20.

Figure 2:
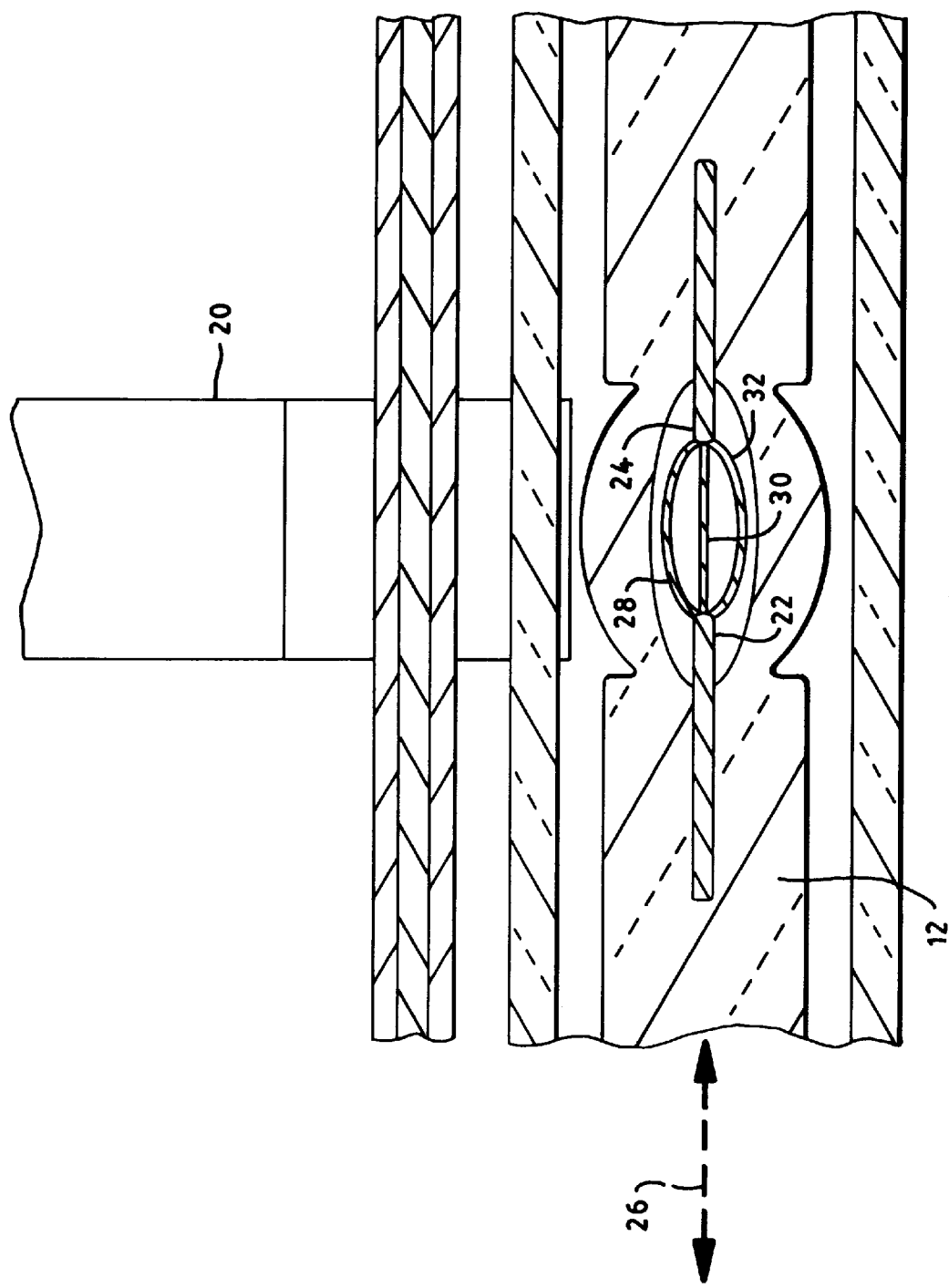
FIG. 2 shows a cross sectional view of the lamp capsule partially broken away.

FIG. 2 shows a cross sectional view of the lamp capsule partially broken away. The preferred lamp is a horizontally operated, miniature arc discharge lamp 12 with a first electrode 22 and a second electrode 24. The electrodes are preferably horizontally positioned along a lamp axis 26. The preferred miniature high intensity discharge (HID) lamp 12, may be any of numerous designs. The preferred embodiment is a double ended press sealed quartz body defining an enclosed volume of about 0.25 cubic centimeters, having a xenon and metal halide fill. The xenon pressure is approximately 6 to 10 atmospheres cold, and about 60 atmospheres hot. The relatively high operating pressure has been found to be useful in magnetic deflection. The preferred lamp has an approximately ellipsoidal interior with a fairly open access around the electrode roots. The open geometry provides a better internal convective flow pattern particularly when the arc is magnetically deflected. The arc discharge lamp 12 without magnetic deflection normally provides a discharge, normal arc 28, generally extending along an upward bending line between a single tip end of the first electrode 22 and a single tip end of the second electrode 24. The interior dimensions of the envelope are chosen to provide sufficient volume that the arc may be moved between preferred optical focal regions to form a proper low beam for a vehicle in one focal region 30 and a proper high beam in a second focal region 32. With regular magnetic deflection, the lamp can provide an axially centered arc in a first focal region 30. With higher magnetic deflection, the lamp can provide a downward curving arc in a second focal region 32.

Positioned around the arc discharge lamp 12 is a cavity type reflector 14. The reflector 14 is optically prescribed to provide a low beam headlamp pattern from a light source in a first focal region 30 for the reflector 14, and may additionally provide a high beam pattern from a light source sufficiently displaced from the first focal region 30 to a second focal region 32. It is understood that arc discharges provide a spatially extended light source, and the reflector 14 may be designed to produce a beam pattern(s) from such an extended source. In one example, the arc was vertically deflected by the electromagnet from a first focal region 30 by about 2 millimeters to a second focal region 32. A combined vertical and lateral offset may also be used. Light received from the second region 32 was then projected to meet a known high beam pattern specification.

Vehicle headlamp reflector 14 designs are used With two filament tungsten halogen capsules, such as those designed for the 9007 tungsten halogen capsule. Such two filament reflector 14 designs generally are formulated to accommodate parasitic reflections from the second filament. The second filament in such a lamp then appears to be on at a low level due to the reflection of light from the first filament. This tends to blend the high beam and the low beam patterns, and therefore requires a somewhat greater light source separation. There is no parasitic reflection in a magnetically adjusted arc lamp 12; however, there may be some overlap of the arc mantel between the focal regions 30, 32. The relative light source displacement needed to adequately separate the high and low beam patterns by the reflector is approximately the same. It is then within the skill in the art of reflector design to make a reflector to produce high and low beam patterns for a magnetically deflected arc source deflected magnetically by about 2.0 millimeters.

FIG. 1 shows a schematic circuit for an alternating current, single electromagnet deflection system. The system comprises a lamp control or ballast 16, an electromagnet controller 18 and an electromagnet 20.

The alternating current lamp controller or ballast 16, may be one of many designs. The AC ballast drives the lamp for proper light output. The relevant feature of concern is the operating frequency of the ballast. In general the lower the operating frequency, the easier it is to accommodate magnetic control; however, lower operating frequency discharge lamps have more defuse arcs, particularly in low pressure lamps, but less so in high pressure lamps. A more diffuse arc tends to give a poorer optical projection. The preferred lamp ballast chops the 12 volt direct current, coming from the vehicle battery, into an alternating current signal. The chopped 12 volt alternating current signal is then transformed to the lamp operating voltage. In the preferred embodiment, the alternating current lamp controller provides a square wave signal and has an operating frequency of about 400 Hz. The arc response time has been found to be slowed in high pressure lamps, thereby lessening the need to closely match the magnetic field with the arc current direction.

Figure 3:
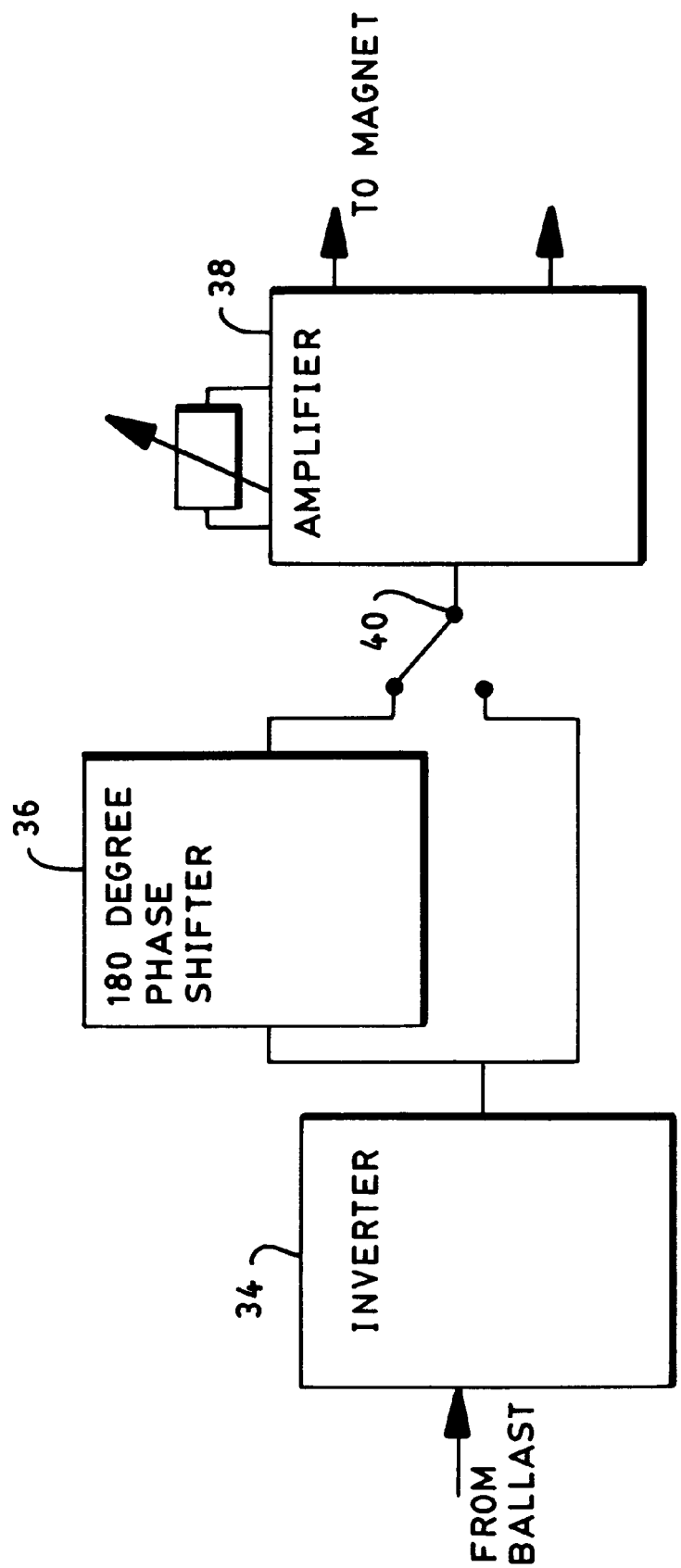
FIG. 3 shows a schematic circuit for an alternating current, single electromagnet deflection system.

The amount of deflection can be controlled in two ways. The first method is to control the amount of deflection, for example up and down, by controlling the supply voltage for the amplifier. FIG. 3 shows a schematic diagram for electromagnetic control using amplifier voltage controlled deflection. This circuit receives a voltage signal indicating the polarity for the lamp voltage. The voltage signal is inverted by inverter 34 and then supplied to both a 180 degree phase shifter and thereafter to one pole of a switch 40. Alternatively the inverted signal is supplied directly to a second pole of the switch 40. The signal from the switch is then supplied to an amplifier 38 and thereafter to the electromagnet. The switch 40 then directs the electromagnetic positioning of the arc varying between full deflection in direction or the opposite direction. Alternatively, by time controlling the switch, the time the switch is switched for one voltage polarity may be balanced against the portion of time the switch is switched for the opposite polarity, the arc position can then be proportioned between full deflection in one direction, versus full deflection in the opposite direction. The switch voltage polarity deflection method is fast and allows for good tracking of the lamp voltage signal. The control however is complicated, since amplitude and polarity are controlled separately.

Figure 4:
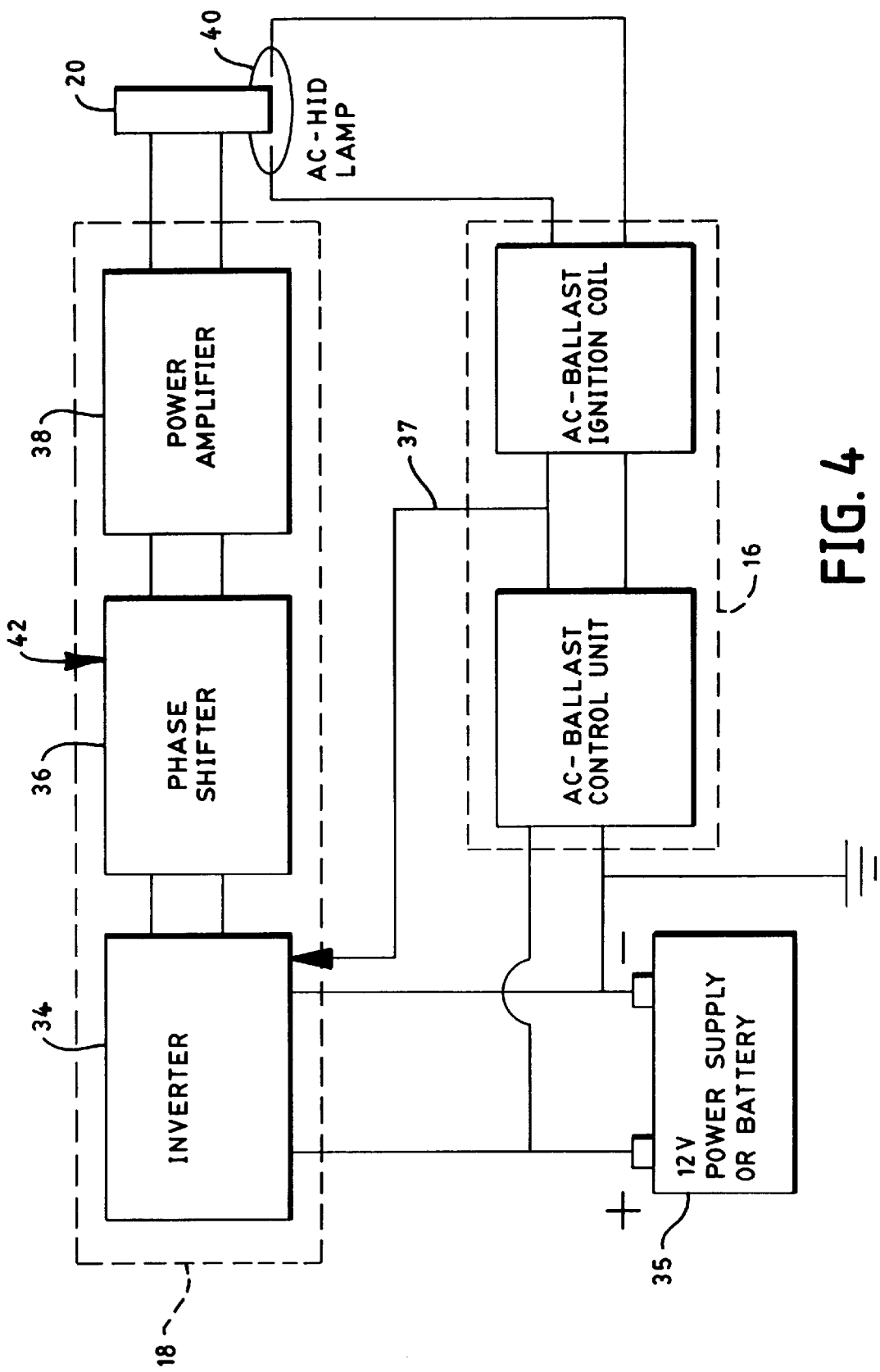
FIG. 4 shows a schematic diagram for amplifier voltage controlled deflection.

The second method is to control arc deflection by adjusting the phase between ballast signal and electromagnet current. FIG. 4 shows a schematic diagram for phase shift controlled deflection. A variable phase shifter 36 for phases from 0 to 180 degree may be placed in front of the amplifier 38. A control voltage, for example, between 0 and 12 Volts, is able to change the phase and drive the arc deflection from full deflection in one direction and full deflection in the opposite direction without the need to change polarity. (It should be understood that by full deflection, the preferred limit is meant, and the particular preferred limit may vary between up, for example centered, and down, for example not so low as to be in the condensate, and right and left which might be closest to the envelope.) The phase shift deflection control scheme has been found to be possible because the arc cannot follow the fast changes in the Lorenz-deflection force. The arc then responds only to the average Lorenz-force over one lamp cycle. At 0 degrees phase shift, the arc is fully deflected in one direction, for example, down. At 90 degree phase shift the arc is undeflected. At 180 degree phase shift, the arc is be fully deflected in the opposite direction, for example up. The phase shift deflection method is better than the switched polarity method because a smoother transition from left to right or up and down is possible. A signal from a sensor maybe used, for example a steering wheel position sensor, or a vehicle horizontal level sensor of may be supplied to the phase shifter, to change deflection of the arc and therefore the beam as needed to adjust to the vehicle angle. Similarly, a vehicle operator elected beam positioner may be sensed. A programmable device, such as a single chip computer, may be used to generate different beam patterns, depending on various vehicle input signals (speed, direction, time of day, ambient light, weather conditions, lighting request, driver inputs, and so forth.)

Figure 5:
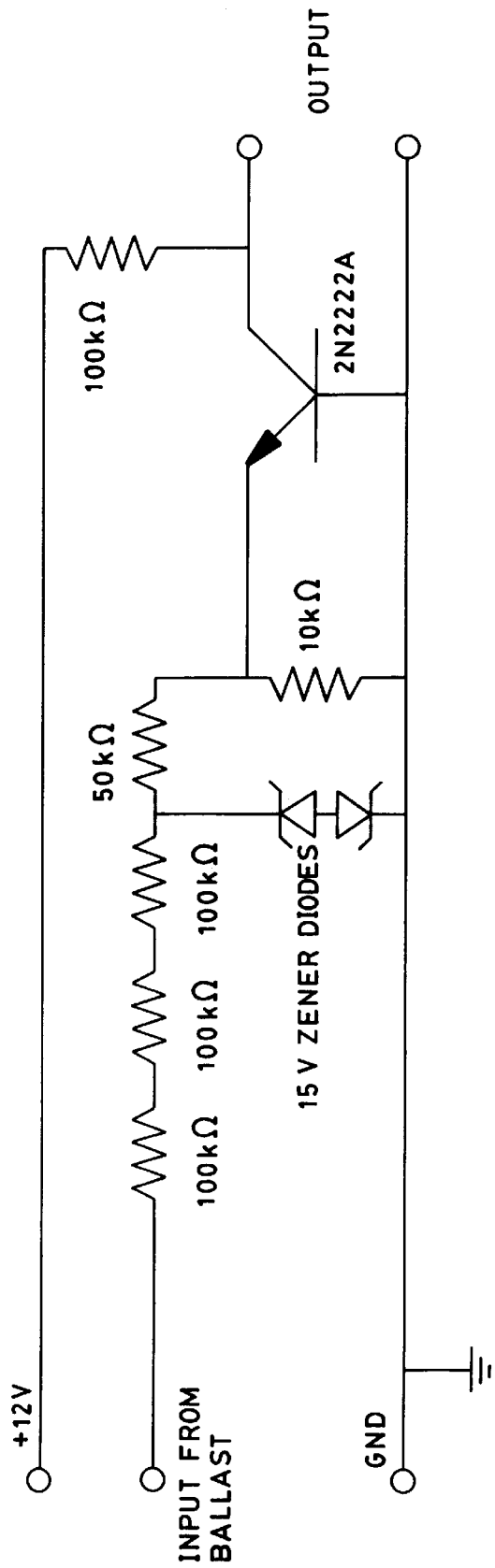
FIG. 5 shows a schematic diagram for phase shift controlled deflection.
Figure 6A:
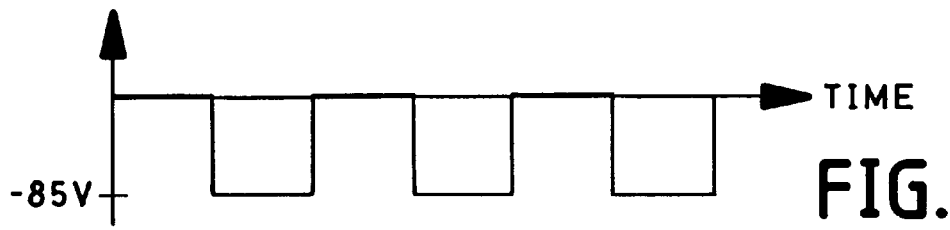
FIG. 6 shows a preferred circuit for an inverter for the schematic circuit of FIG. 5.
Figure 6B:
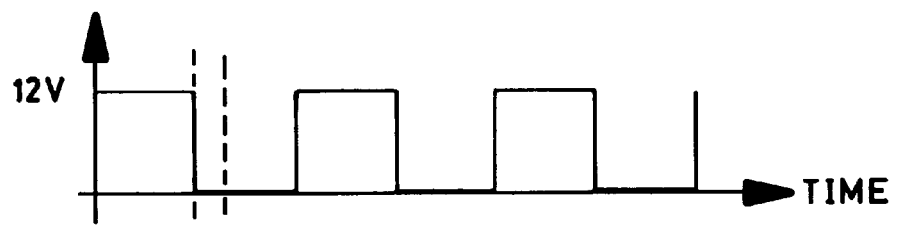
Figure 6C:
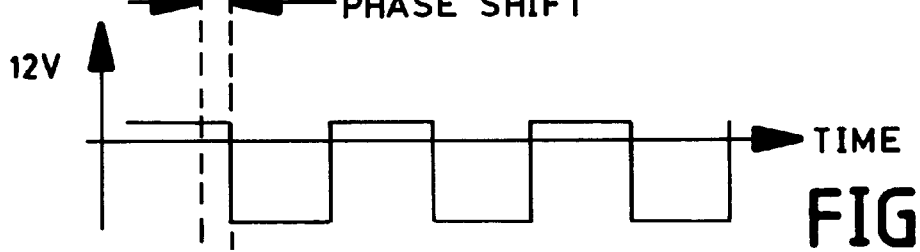
Figure 6D:
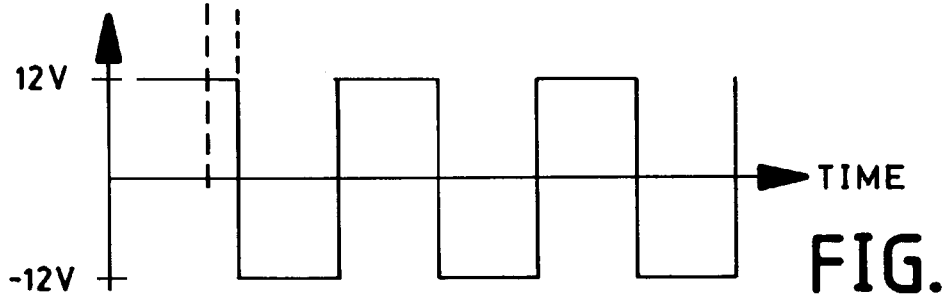

The preferred inverter circuit is shown in FIG. 5. The inverter 34 receives DC power from the battery 35, for example a 12 V DC vehicle battery, and a voltage signal which indicates the lamp voltage 37, such as a square wave signal from the ballast. The voltage signal 37 can be for example the lamp voltage itself or a square wave signal from the ballast, that is in phase with the lamp voltage. The preferred inverter is designed to use the lamp voltage as the voltage signal input. The lamp voltage signal used here is negative compared to ground, and is transformed into a square wave signal between 0 and 12V. The inverted output is then supplied to the phase shifter 36. FIG. 6 shows the polarity, timing, and scale relations between the preferred inverter 34, phase shifter 36, power amplifier 38 and the lamp 40, wherein a) is the lamp voltage signal, b) is the inverted lamp voltage signal, c) is the phase shifted signal and d) is the amplified phase shifted signal.

Figure 7:
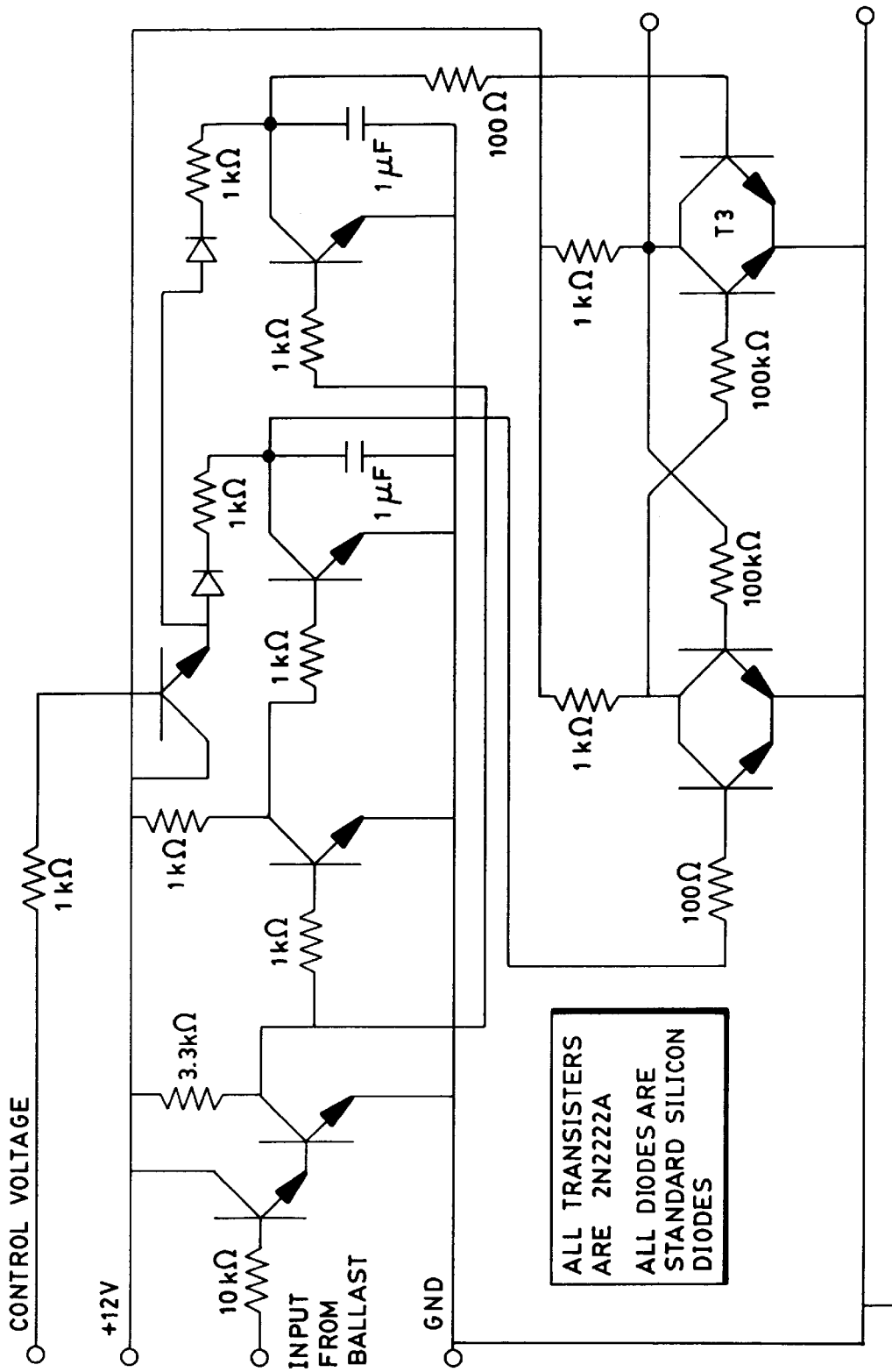
FIG. 7 shows a preferred power amplifier circuit for the schematic circuit of FIG. 3 for driving the electromagnet.

The phase shifter 36 receives DC power from the battery, the signal from the output of the inverter 34 and a control signal 42 indicating the desired phase shift. The control signal 42 is a voltage between 0 and 12 V and can come from a source indicating the preferred beam direction. Examples of possible beam direction sources include 1) a common high beam and low beam controller or switch, 2) an adaptive beam pattern controller, which adjusts the beam according to sensors on the vehicle that indicate the position of the steering wheel or position of the vehicle in respect to the road, and 3) a manual or electronic beam control for special lighting, such as day light running, emergency, signal, spot, fog, or flood lighting. The output of the phase shifter 36 is a 12 volt square wave signal shifted by a phase between 0 and 180 degrees according to the control signal 42. The relationship between the control signal and the phase shift need not be linear, and an additional simple electronic circuit may be inserted to achieve non-linear offsets in the phase signal. FIG. 7 shows a circuit diagram for a preferred embodiment of the phase shifter. The preferred designs anticipates a simple linear deflection depending on the phase shift signal. With a zero (0) degree phase shift, the lamp arc may be fully deflected in one direction, and with a 180 degree phase shift, the arc may be fully deflected in the opposite direction. With a 90 degree phase shift, the lamp arc would hold a centered position.

Figure 8:
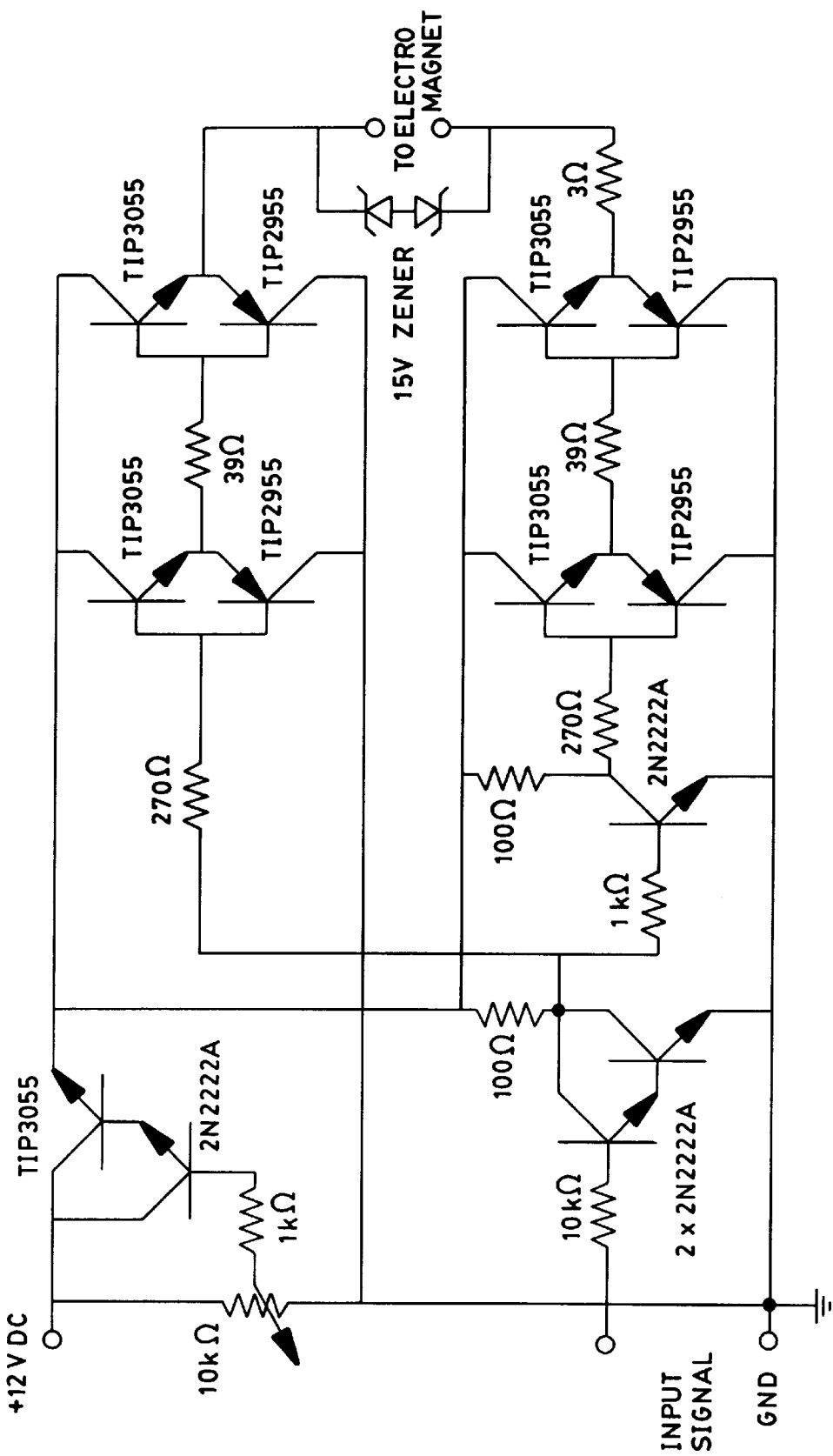
FIG. 8 shows a top schematic view of an alternating current deflected vehicle headlamp with a single elliptical magnet.

The amplifier 38 receives DC power from the battery and the output of the phase shifter 36. The amplifier 38 output is a +/−12 volt, 2 ampere signal, driving the electromagnet 20. Each of the two output lines switch between 0 and +12 volts, so that the voltage across the electromagnet can be from +12 volts to −12 volts. FIG. 8 shows a preferred power amplifier circuit for the schematic circuit of FIG. 4 for driving the electromagnet. In this embodiment, a 12 ohm (Ω) resistor limits the current, and also increases the operating frequency. A lower resistance may be used to increase the deflection range. The time constant for an RL circuit is $$\tau = \frac{L}{R_{total}} = \frac{L}{R + R_L}$$

therefore the maximum frequency response of the circuit is $$f = \frac{R + R_L}{L}$$

A higher limiting resistor would allow higher frequencies, but would reduce the electromagnet current. To get the same magnetic field, either a higher voltage or more turns in the coil of the electromagnet would have to be used to compensate for the lower electromagnet current.

Figure 9:
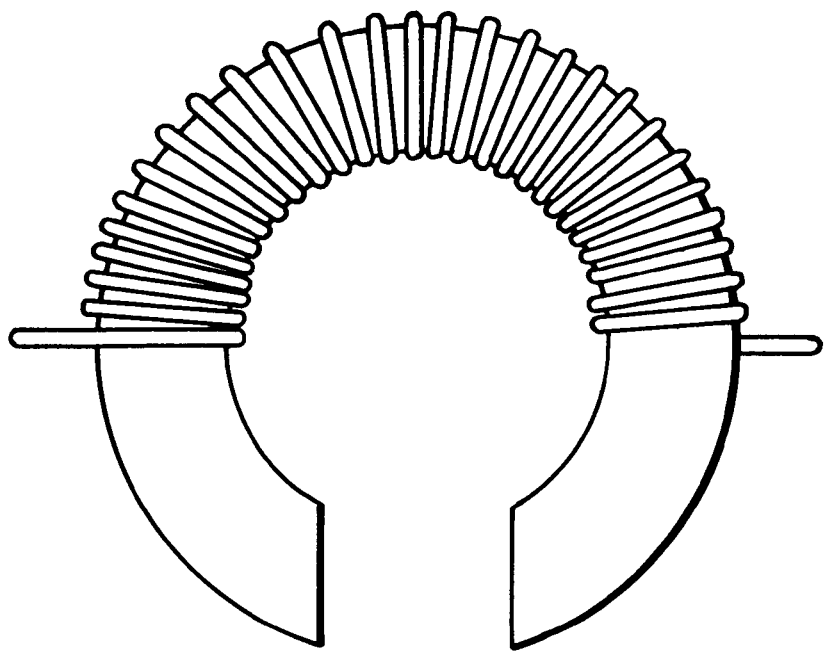
FIG. 9 shows a front view of headlamp of FIG. 8.
Figure 10:
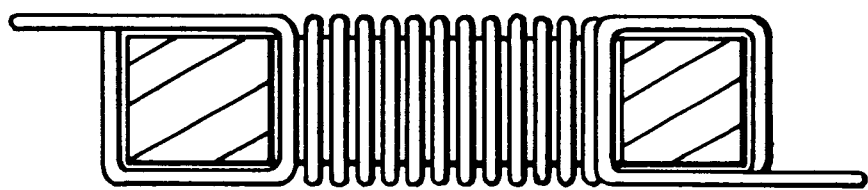
FIG. 10 shows a top schematic view of an alternating current deflected vehicle headlamp with two elliptical magnets.

The 12 volt phase shifted, amplified, alternating current signal then drives the electromagnet 20. FIG. 9 shows a side view of a preferred embodiment of an electromagnet. FIG. 10 shows cross-sectional view of a preferred embodiment of an electromagnet. Since it does not make sense to draw more current for the magnetic field than for the lamp, a current limit of 1.0 ampere is chosen for the preferred design. Another reason for the current limit is to limit heat dissipation in the electromagnetic coils. The magnetic field should alternate directions to follow the alternating current of the arc. In the present lamp configuration, the magnetic field needs to be 3 millitesla (mT) (30 Gauss) or more to achieve sufficient deflection of the arc. The maximum coil current is chosen to be about one ampere. The response frequency for the electromagnet should meet or exceed the frequency of the applied alternating current driving the lamp, which in this case is chosen to be about 400 Hz.

To provide the magnetic fields necessary to cause deflection for the small HID lamp, about 30 Gauss or 3.0 mT, was needed, and the number of ampere-turns was found to be about 50. The magnetic field increases linearly with the number of turns (N). As the number of turns increases, the inductance of the magnetic circuit increases with the square of the number of turns ($N^2$). When there are too few turns, the electromagnet provides insufficient magnetic field to deflect the arc. As the inductance increases, the operating frequency decreases inversely with the inductance. Assuming a 1.0 ampere operating current, the system is then constrained to be between 50 and 280 turns for the characteristic dimensions of the system. By staying to the low side of the turns curve, (50 turns) and tolerating a higher operating current, the alternating arc current can be tracked quite closely with the magnetic field.

The choice of materials for an alternating current magnetically deflected discharge lamp depends on several factors. The frequency of the applied current is likely to form eddy currents which result in heat and degrade the electromagnet performance. A ferrite material was therefore selected with a permeability approximating that of silicon steel (transformer steel) ($\mu$=500) but with no conductivity to support eddy effects. The material also has a flat magnetization versus temperature curve, out to a Neel temperature of 150 degrees Celsius where it drops off steeply.

The dimensions of the electromagnet core are partially dictated by the HID lamp. The preferred electromagnet end width or diameter exceeds the electrode tip to electrode tip discharge length to achieve a homogeneous magnetic field along the whole arc region. In one embodiment, the electrodes were about 7.0 millimeters apart, which meant a 1.0 centimeter was a good starting diameter for the end width of the core piece. The gap between the pole pieces shoes has to be wider than the lamp thickness, which is about 2.0 centimeters, including a covering capsule. The length of the electromagnet does not affect the magnetic field, but it does affect the inductance. It is better to wrap the same number of turns around a longer core, as in the first design than a shorter core, as in the second design. The following calculations are based on the first design.

The magnetic field at the lamp can be estimated by $$B = \frac{\mu_0 I \cdot N}{gap + \frac{l}{\mu}} \quad \text{or} \quad N = \frac{B \cdot gap + \frac{l}{\mu}}{\mu_0 I} = 50$$

The current I is set to be 1 ampere. The gap is 2.0 centimeters. The permeability $\mu$ is 500 units. The length of the core (l) is 12.0 centimeters. If a magnetic field of 3.0 millitesla (mT) is to be achieved, the coil needs to have about 50 turns. The ohmic resistance of the coil can be calculated from the material constants of the wire (Copper: conductivity σ=107 Ω-1m-1, wire diameter d=1 millimeter)

$$R_L = \frac{8\sqrt{A} \cdot N}{\sqrt{\pi} \cdot \sigma \cdot d^2} = 0.2 \, \Omega$$

where A is the core's cross sectional area, and N is the number of coil turns. The inductance of the coil is:

$$L = \mu\mu_0 \frac{N^2}{l} A = 500 \mu_0 \frac{50^2}{12 \, cm} 0.785 \, cm^2 = 1.03 \, mH$$

The maximum frequency is:

$$f = \frac{R + R_L}{L} = \frac{12.2 \, \Omega}{1.03 \, mH} = 11.8 \, kHz$$

The number of turns on the coil N can be chosen for a higher magnetic field and a lower frequency if necessary. The minimum frequency was given to be 400 Hz and the minimum magnetic field was 3 millitesla (mT). This defines a frequency range for this design.

Two major design criteria have been followed. A coil with a ferrite or transformer steel core is used to achieve a lower inductance than in a comparable air coil, which would produce the same magnetic field. For this embodiment, ferrite was used because transformer steel overheated at 400 Hz due to eddy currents. Secondly, the frequency response of the electromagnet is improved by increasing the length of the coil (with core), while incurring only negligible changes in magnetic field.

There are many possible core geometries. One preferred design uses a ferrite rod (1.0 centimeter diameter) with an elliptic or circular shape having a small gap formed in one of the longer side portions. The free ends of the core then face each other across the gap. The gap is sufficiently wide to receive an arc lamp there between with the arc aligned perpendicular to the line between the free ends of the core. The electromagnet may be rotated forward to any preferred position, such as to extend across the axis in a light shield like position, or to be located perpendicularly below the lamp.

Figure 11:
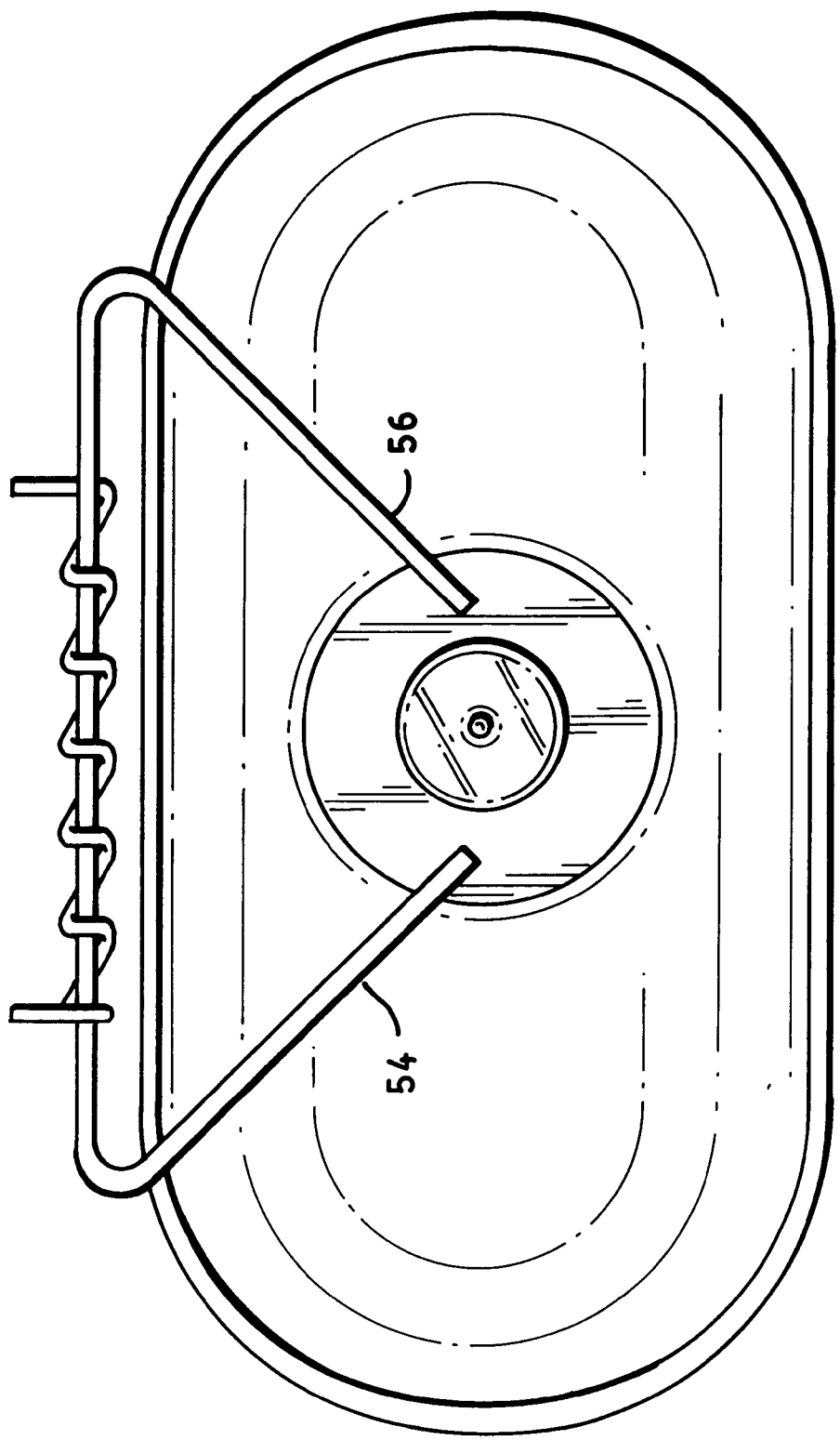
FIG. 11 shows a front view of headlamp of FIG. 10.
Figure 12:
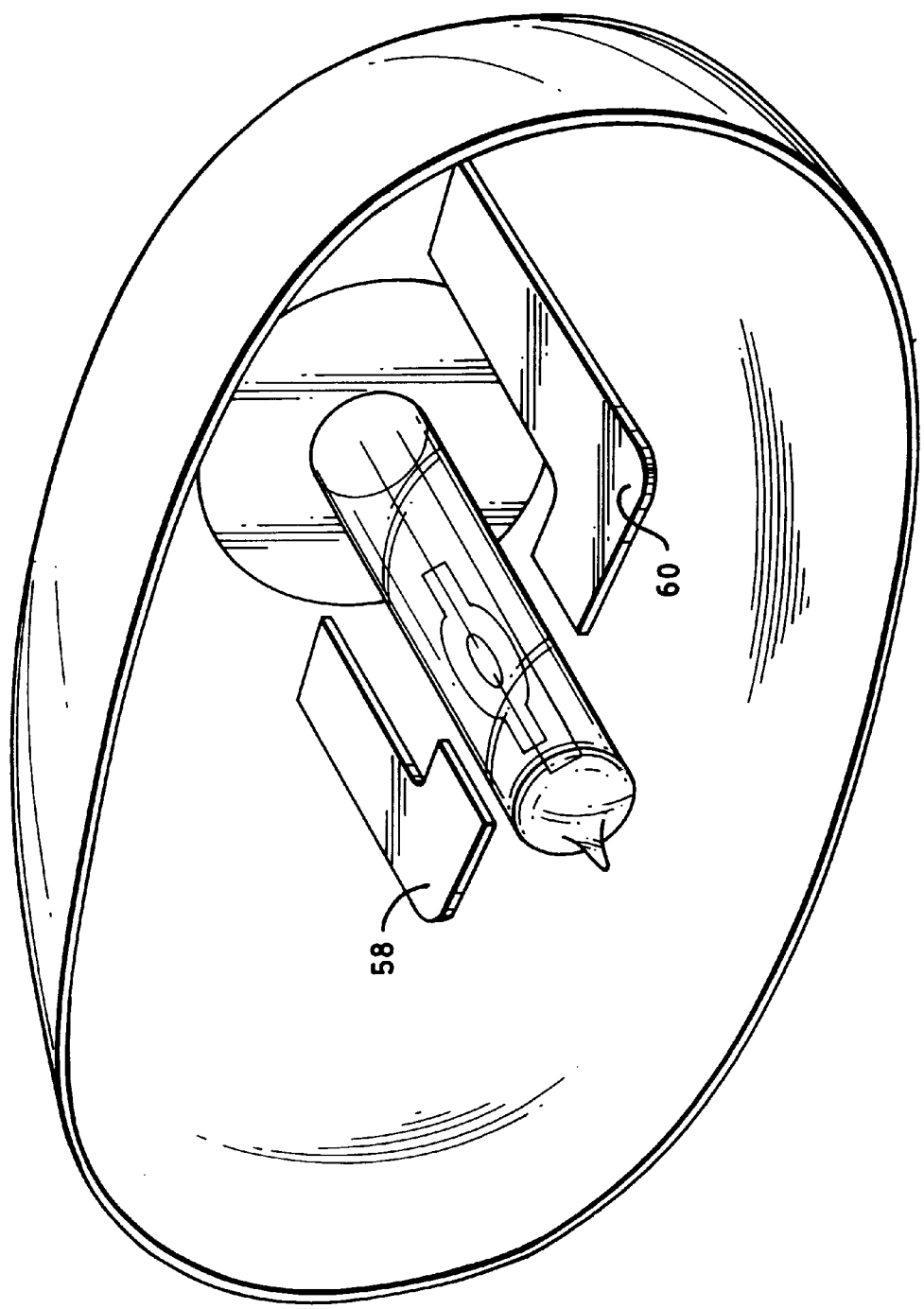
FIG. 12 show charts of the AC ballast signal and magnetic current in microseconds for the lamp in operation.

An alternatively preferred design uses two separate electromagnet pole pieces placed to the right and left of the lamp. FIG. 11 shows a front schematic view of a discharge lamp in cooperation with an electromagnet with pole pieces 54, 56. The pole pieces extend down from the upper exterior of the reflector housing at angles to point radially inwards towards the arc lamp. FIG. 12 shows a front perspective view of a discharge lamp in cooperation with an electromagnet with pole pieces 58, 60. The pole pieces extend from the rear of the lamp reflector in the horizontal plane on either side of the arc lamp.

An alternating magnetic deflection system is bandwidth limited. Increasing the number of turns to amplify the magnetic field increases the inductance of the magnetic circuit and lowers the operating frequency of the device. When there are too many turns on the electromagnet, the rise time of the magnetic field fails to match the rise time of the lamp current. Theoretically, when the rise time fails to match the lamp current exactly, then either the accelerating electrons encounter no magnetic field, in which case the arc is undeflected, and no benefit derives from the magnetic structures, or the magnetic field is rising or falling, too early or too late, potentially resulting in misdeflection or fluffing of the arc. In practice, the high pressure arc exhibits a high degree of inertia, preferring to remain where it is. This is a consequence of the high fill gas pressure (about 6 atmospheres cold). The high density of the xenon fill gas inhibits redistribution of the arc currents and relaxes the requirements for a high degree of match in the application of the magnetic field and the discharge current. It has been found that if the magnetic rise time is sufficient to stay in phase with the lamp current, the system can work well. If the magnetic rise time is faster than the lamp operating frequency, the magnetic field can be in place before the lamp current is effectively accelerating electrons and ions.

Figure 14:
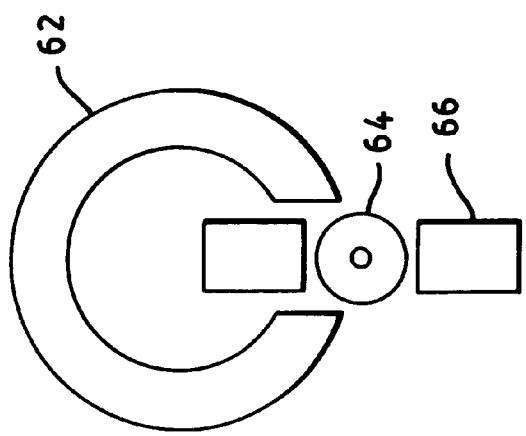
FIG. 14 shows a schematic design for a headlamp system with two arc deflecting electromagnets.
Figure 13:
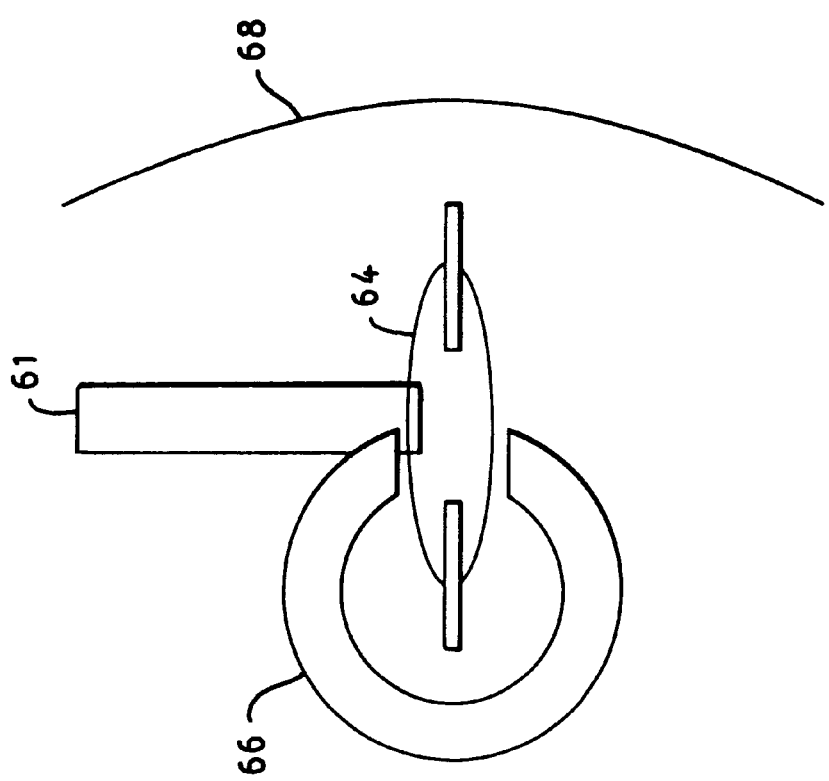
FIG. 13 shows a schematic design for a headlamp system with two arc deflecting electromagnets.

One of the uses of magnetic deflection in a vehicle head lamps is to adapt the headlamp beam pattern to particular driving conditions. To achieve this it is convenient to use two electromagnets. A complete system would consist of a ballast, an AC HID lamp, a reflector/housing assembly, two deflection magnets, and two deflection electromagnet amplifier systems. The magnetic fields are preferably perpendicular to each other and both are perpendicular to the arc. It is also convenient to align the magnets so that one deflects the arc in the horizontal direction, and the second deflects the arc in the vertical direction. While it is possible to align the magnets at other angles, the system controls to balance the necessary relative deflections by the two magnets then becomes more cumbersome. The two deflections may both be positive and negative (up and down or left and right) with the same control without the need for a separate polarity changer or a 180 degree phase shifter. The two electromagnets may be driven by two separate amplifier systems. Both amplifier systems may pick up, and use the same input control signal from the ballast. FIGS. 13 and 14 show a schematic design for a headlamp system with two arc deflecting electromagnets. One electromagnet 62 is positioned to be over and transverse to the lamp 64 to provide a horizontally transverse magnetic field, while a second electromagnet 66 is positioned in front of and vertically turned to provide a transverse and vertical magnetic field. A reflector 68 is positioned reward of the lamp o FIG. 14 shows a forward looking view of the same arrangement in FIG. 13. It should be understood that electromagnets with pole structures may again be used. Further, it would be convenient to incorporate the forward electromagnet 66 into a heat or light shield structure commonly used in some headlamp system.

Magnetic control of the discharge in both the horizontal and vertical directions enables various beam positioning options. The beam may be altered according to vehicle speed. The beam may be made to "look" in the direction of the vehicle is turning. The addition of a second electromagnet to deflect the arc in a direction different from the first deflection further makes the system even more capable of beam variations. Positioning the second electromagnet, is most effective if it aligns the second magnetic field perpendicular to both the original magnetic field and the arc discharge axis. Actual electromagnet positioning is partially a matter of design choice. The positioning of the two electromagnets needs to be coordinated with the operation of the two drivers for the electromagnets. Portions of the two magnetic fields may then be added, and the proportioning of them may change over the driving power cycle or may switch between fixed combinations to move the arc between set positions, either for fixed operation or to cycle the arc between chosen positions. The electronic controls for switching between such fixed beam positions are considered within the skill in the electronic arts.

The alternating current systems may be operated in two modes simultaneously. In one period the beam is placed in one mode, and in the second period the beam is placed in a second mode. For example, one mode may be low beam, and the second mode may be high beam. The combined average beam would then be a daylight running with half the total power emerging in the low beam direction and half the power emerging in the high beam direction. Another method would to sweep the beam between high and low beams, or further to include right and left sweeps for fog, rain or other difficult seeing conditions. Intermediate beam modes are also possible. Sensing the lamp voltage may be used as an indication of discharge length and coincidentally the discharge position. Arc position sensing may be used in particular for feedback control and more exact beam positioning. Again, the electronic controls for dynamically switching or sweeping beam positionings are considered within the skill in the electronic arts, as is the use of feedback control to refine positioning.

In a working example of the method was carried out with some of the conditions as follows: A Robert Bosch GmbH alternating current ballast for a miniature HID lamp was used. The ballast ran at 400 Hz and produced a square wave signal, that means the electromagnet and the electromagnet amplifier had to have a bandwidth equal to or greater than the 400 Hz. The preferred system was designed to operate at up to about 16 kHz. The electromagnet core used was the one shown in the first design, FIGS. 5 and 6. The core diameter was about 1.0 centimeter. The core length was about 12.0 centimeters. Fifty (50) turns were equally distributed over the whole length of the core. The coil had about a 12 ohm (Ω) current limiting resistor for the driving circuit at a voltage of 12 volts. A ferrite core material with the shape of a split torus was used. The particular electromagnet was 1.0 centimeter by 1.0 centimeter cross-section, with a 4.0 centimeter inner diameter, a 2.0 centimeter gap cut in the electromagnet to receive the lamp when positioned together.

In one embodiment the electromagnet was made with a split circular core. The core material was a MnZn ferrite. The inner diameter was 38.1 millimeters (1.5 inches), and the outer diameter was 63.5 millimeters (2.5 inches). The formed gap was 19.0 millimeters (0.75 inches) wide with sidewalls parallel to a diameter. The gap was large enough to position the lamp within the gap. The core was 12.7 millimeters (0.5 inches) thick. Fifty turns of insulated copper transformer wire (AWG 14) were tightly, and evenly wrapped around the core extending along the 180 degree section on the side way from the formed gap.

Figure 15A:
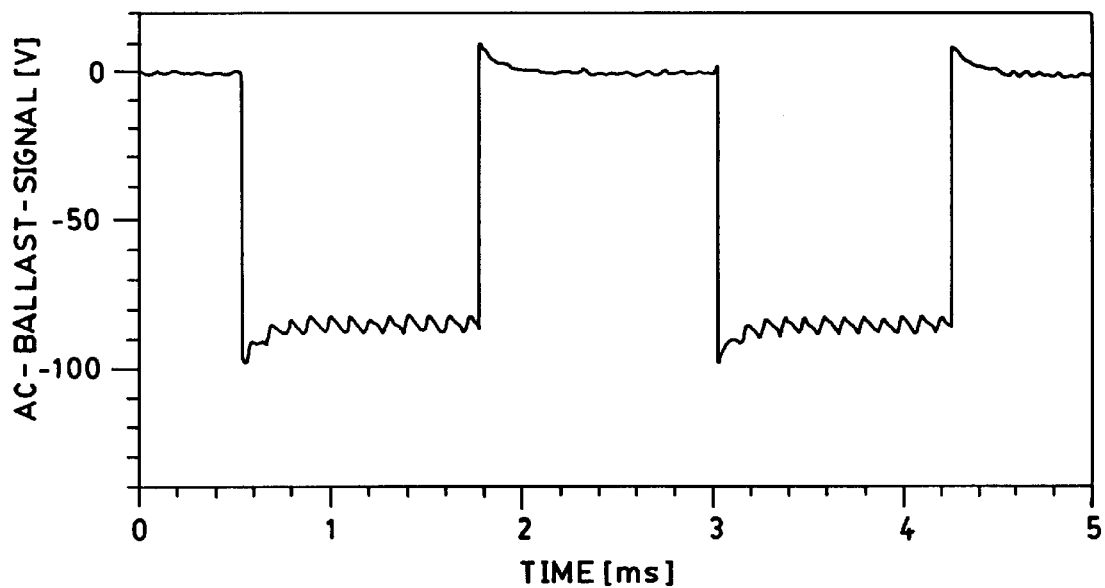
FIG. 15 shows a chart of the AC ballast signal and magnetic current in microseconds for the lamp in operation.
Figure 15B:
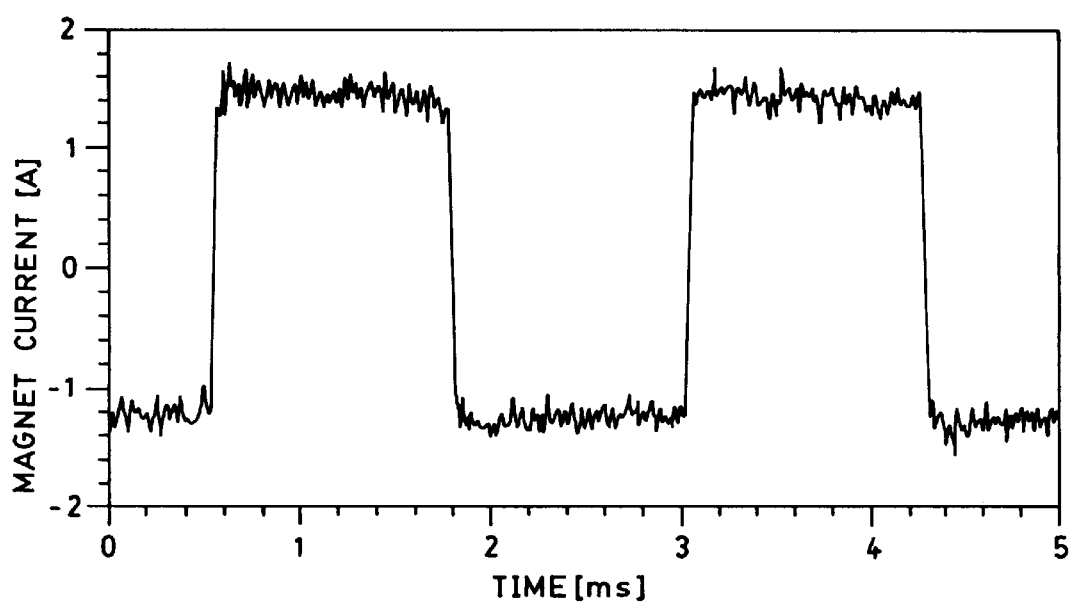

FIG. 15 shows a chart of the AC ballast signal and magnetic current in microseconds for the lamp in operation. The rise time of the electromagnet current, which is proportional to the magnetic field, is about 30 microseconds. The maximal frequency f=1/(2×30 microseconds)=16 kHz. At this scale, it can be seen from the very similar square wave signals (negatives of each other) that overall the magnetic deflection is very closely paired to the lamp current. Experiments have shown that the electromagnet amplifier system can straighten the HID lamp arc and even push the arc down against the bottom of the lamp, if so desired. If the phase of the electromagnet signal is shifted by 180° relative to the lamp arc signal, the arc is pushed upward against the top of the lamp.

Figure 16A:
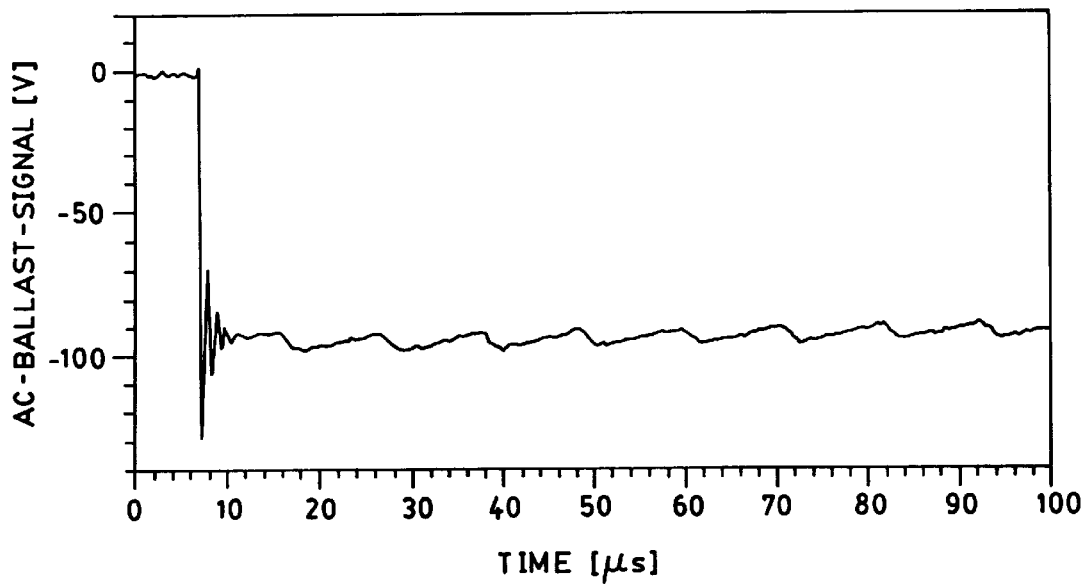
FIG. 16 shows a chart of a sample of the AC ballast signal and magnetic current signal in microseconds for the lamp in operation.
Figure 16B:
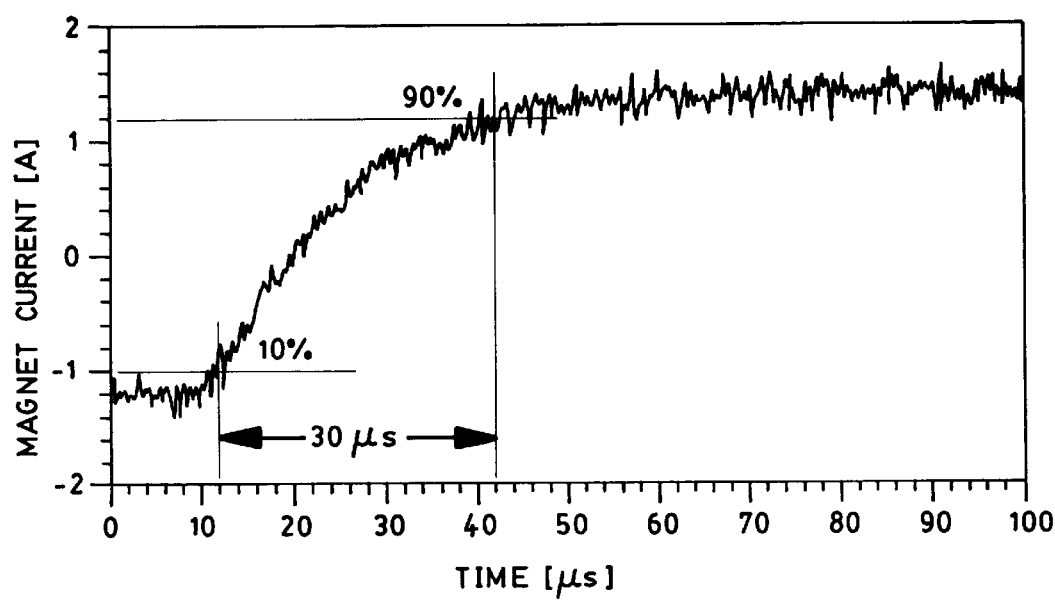

FIG. 16 charts a sample of the AC ballast signal and magnetic current signal in microseconds for the lamp in operation. There was approximately a 45 microsecond lag while the magnetic deflection circuit adjusted to the change in the lamp current. Since the lamp current signal rises for about 1.1 microseconds, the mismatched deflection during the transition period is only about 4.0 percent of the total cycle time or 4.0 percent of 2.5 microseconds.

The disclosed operating conditions, dimensions, configurations and embodiments are intended as examples only, and other suitable configurations and relations may be used to implement the invention. While there have been shown and described what are at present considered to be the preferred embodiments of the invention, it will be apparent to those skilled in the art that various changes and modifications can be made herein without departing from the scope of the invention defined by the appended claims.

What is claimed is:

1. A lamp system comprising:

an arc discharge lamp having an arc formed between two electrodes, a lamp controller receiving power from a power source, and providing alternating lamp current having a first portion of the alternating cycle, and a second portion of the alternating cycle, the alternating current to power the lamp, and providing a power signal indicating the state of the lamp current, an electromagnet positioned adjacent the lamp to affect the position of the arc, and an amplifier circuit receiving power from a power source, and receiving the power signal, and providing a first current during the first portion of the current cycle and providing a second current during the second portion of the current cycle to drive the electromagnet with respect to the alternating lamp current.

2. A lamp system comprising:

an arc discharge lamp having an arc formed between two electrodes, a lamp controller receiving power from a power source, and providing alternating lamp current having a first portion of the alternating cycle, and a second portion of the alternating cycle, the alternating current to power the lamp, and providing a power signal indicating the state of the lamp current, a first electromagnet positioned adjacent the lamp to affect the position of the arc in a first direction, a second electromagnet positioned adjacent the lamp to affect the position of the arc in a second direction, different from the first direction, and an amplifier circuit receiving power from a power source, and receiving the power signal, and providing a first current during the first portion of the current cycle to the first electromagnet with respect to the alternating lamp current to direct the arc in the first direction, and providing a second current during the second portion of the current cycle to drive the second electromagnet with respect to the alternating lamp current to direct the arc in the second direction, wherein the amplifier in a first state provides magnetic power control with a first phase relation with respect to the lamp current, and in a second state provides magnetic power control with a second phase relation with respect to the lamp current, and wherein the lamp system further includes a switch to switch the amplifier between the first state and the second state.

3. A lamp system comprising:

an arc discharge lamp having an arc formed between two electrodes, a lamp controller receiving power from a power source, and providing an alternating lamp current, the alternating lamp current powering the lamp, and providing a lamp power signal indicating the state of the lamp current, an electromagnet positioned adjacent the lamp to affect the position of the arc, and a phase shifting circuit receiving power from a power source, and receiving the lamp power signal, the phase shifting circuit providing a magnet power signal synchronized with the lamp current power signal and having a phase offset from the lamp power signal proportionate to the decree of deflection sought, the magnet power signal being provided to the electromagnet to drive the electromagnet.

4. The lamp system in claim 3, wherein the number of turns on the electromagnet are sufficient to provide deflection of the arc, and less than the number of turns causing an inductance sufficient to inhibit the rise time of the magnetic field from matching or exceeding the rise time of one half the lamp cycle.

5. A lamp system comprising:

an arc discharge lamp having an arc formed between two electrodes, a lamp controller receiving power from a power source, and providing alternating lamp current to power the lamp, and providing a power signal indicating the state of the lamp current, an electromagnet positioned adjacent the lamp to affect the position of the arc, and an amplifier circuit receiving power from a power source, and receiving the power signal, and providing alternating current electromagnet power to drive the electromagnet with respect to the alternating lamp current, wherein the amplifier in a first state provides magnetic power control with a first phase relation with respect to the lamp current, and in a second state provides magnetic power control with a second phase relation with respect to the lamp current, and wherein the lamp system further includes a switch to switch the amplifier between the first state and the second state.

6. The lamp system in claim 5, wherein the first phase relation is a zero phase shift.

7. The lamp system in claim 5, wherein the first phase relation is a 180 degree phase shift.

8. A lamp system comprising:

an arc discharge lamp having an arc formed between two electrodes, a lamp controller receiving power from a power source, and providing alternating lamp current having a first portion of the alternating cycle, and a second portion of the alternating cycle, the alternating current to power the lamp, and providing a power signal indicating the state of the lamp current, a first electromagnet positioned adjacent the lamp to affect the position of the arc in a first direction, a second electromagnet positioned adjacent the lamp to affect the position of the arc in a second direction, different from the first direction, and an amplifier circuit receiving power from a power source, and receiving the power signal, and providing a first current during the first portion of the current cycle to the first electromagnet with respect to the alternating lamp current to direct the arc in the first direction, and providing a second current during the second portion of the current cycle to drive the second electromagnet with respect to the alternating lamp current to direct the arc in the second direction.

9. The lamp system in claim 8, wherein the first phase relation is a zero phase shift.

10. The lamp system in claim 8, wherein the first phase relation is a 180 degree phase shift.

11. A lamp system comprising:

an arc discharge lamp having an arc formed between two electrodes, a lamp controller receiving power from a power source, and providing alternating lamp current, the alternating current to power the lamp, and providing a lamp power signal indicating the state of the lamp current, an electromagnet positioned adjacent the lamp to affect the position of the arc, and an amplifier circuit receiving power from a power source, and receiving the lamp power signal, the amplifier circuit providing a magnet power signal synchronized with the lamp current power signal and having an amplitude proportionate to the degree of deflection sought to drive the electromagnet with respect to the alternating lamp current.

12. The lamp system in claim 11, wherein the number of turns on the electromagnet are sufficient to provide deflection of the arc, and less than the number of turns causing an inductance sufficient to inhibit the rise time of the magnetic field from matching or exceeding the rise time of one half the lamp cycle.

13. The lamp in claim 11, wherein the magnet power signal is a proportionate sum of the lamp power signal and an inversion of the lamp power signal.

14. The lamp in claim 13, wherein a time controlled switch proportions the sum of the lamp power signal and the inversion of the lamp power signal.

15. A lamp system comprising:

an arc discharge lamp having an arc formed between two electrodes, a lamp controller receiving power from a power source, and providing alternating lamp current to power the lamp, and providing a power signal indicating the state of the lamp current, an electromagnet positioned adjacent the lamp to affect the position of the arc, and an amplifier circuit receiving power from a power source, and receiving the power signal, and providing alternating current electromagnet power to drive the electromagnet with respect to the alternating lamp current.

16. The lamp system in claim 15, wherein the electromagnet has an inductance low enough to match the operating frequency of the lamp.

17. The lamp system in claim 15, wherein power control includes a ballast portion and an ignition portion, and the power signal is generated by the ballast portion.

18. The lamp system in claim 15, wherein the lamp current is provided as a square wave signal.

19. The lamp system in claim 15, wherein the electromagnet includes a ferrite core.

20. The lamp system in claim 15, wherein the electromagnet has a current rise time that is less than or equal to one half the cycle time of the lamp power current.

21. The lamp system in claim 15, wherein the number of turns on the electromagnet are sufficient to provide deflection of the arc, and less than the number of turns causing an inductance sufficient to inhibit the rise time of the magnetic field from matching or exceeding the rise time of one half the lamp cycle.

22. A lamp system comprising:

an arc discharge lamp with a high operating pressure, having an arc formed between two single tipped electrodes, a lamp controller receiving power from a power source, and providing alternating lamp current to power the lamp, generating an arc between the electrode tips and, and providing a power signal indicating the state of the lamp current, an electromagnet positioned adjacent the lamp to affect the position of the arc, and an amplifier circuit receiving power from a power source, and receiving the power signal, providing alternating current electromagnet power to drive the electromagnet with respect to the alternating lamp current, and a reflector having a first focal region offset from a second focal region by about 2 millimeters, with the reflector positioned around the lamp, with the arc within magnetically deflectable range of the first focal region and the second focal region.

23. The lamp system in claim 22 wherein electromagnet has about 50 turns.

24. The lamp system in claim 22 wherein electromagnet has a ferrite core.

25. The lamp system in claim 22 wherein electromagnet has about a core about 12 centimeters long.

26. The lamp system in claim 22 wherein electromagnet has electromagnet current rise time of about 30 microseconds.

27. The lamp system in claim 22 wherein electromagnet has two pole pieces with at least one free end each, the two free ends of which are located approximately in a horizontal plane on either side of an axis extending between the electrode tips.

28. The lamp system in claim 27 wherein a gap between the free ends of the are separated by about 2 centimeters.

29. The lamp system in claim 27 wherein the pole pieces extend through the upper portion of the reflector at angles to the horizontal to point radially inwards towards the arc lamp.

30. The lamp system in claim 27 wherein the pole pieces extend through the rear portion of the reflector in a horizontal plane on either side of the lamp.

* * * * *